(No Model.)

P. H. WILMS.
HARROW TOOTH HOLDER.

No. 370,915. Patented Oct. 4, 1887.

Witnesses.
John C. Perkins
William C. Byington

Inventor.
Peter H. Wilms
By Lucius C. West
Atty.

UNITED STATES PATENT OFFICE.

PETER H. WILMS, OF HOLLAND, MICHIGAN.

HARROW-TOOTH HOLDER.

SPECIFICATION forming part of Letters Patent No. 370,915, dated October 4, 1887.

Application filed March 14, 1887. Serial No. 230,869. (No model.)

*To all whom it may concern:*

Be it known that I, PETER H. WILMS, a citizen of the United States, residing at Holland, county of Ottawa, State of Michigan, have invented a new and useful Harrow-Tooth Holder, of which the following is a specification.

This invention relates to that class of harrow-tooth holders which are made in two parts provided with grooves to receive the edges of the tooth, and it has for its object certain peculiarities of construction, below described and claimed, designed to increase their utility and facilitate their adjustment.

Figure 1:
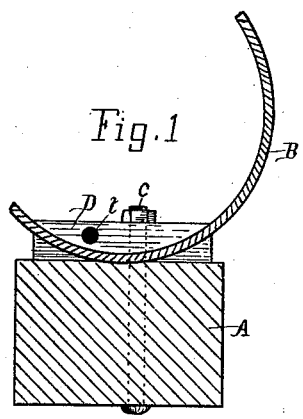
Figure 2:
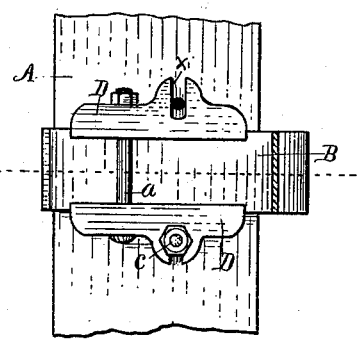

In the drawings forming a part of this specification, Figure 1 is a vertical section on the dotted line in Fig. 2; Fig. 2, a plan, and Fig. 3 an enlarged perspective of one of the parts of the holder.

Referring to the lettered parts of the drawings, A is a harrow-beam designed for float-harrows.

B is a broken part of a curved tooth attached by the holder on top of the beam.

Figure 3:
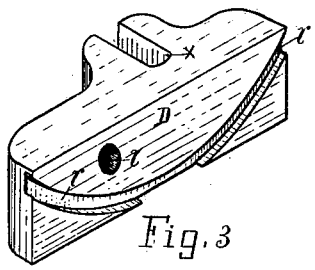

Referring to Fig. 3, D is a block having a groove, $r$, in its inner face, said groove curving from the center of the block at the lower side both ways upward to the ends of the block. It will be observed that this groove cuts through the lower side of the block, so that the groove is narrower at this point when the block D sets on the beam A, as in Fig. 1. By this means the lower surface of the curve of the tooth in the holder is caused to firmly engage the beam itself when both blocks, as in Fig. 2, are firmly attached to the beam by the bolts $c$. By this means the upper walls of the grooves firmly press upon the tooth, and this, in connection with the engagement of the tooth with the wooden beam at the opening of the groove, as before explained, causes an effectual securing of the tooth without depending on any side clamping of the edges of the tooth in the grooves, as heretofore. The bolt $a$ in the holes $t$ of the blocks at one side of the horizontal center of the blocks, in connection with the bolts $c$, prevents lateral displacement of the blocks, and the bolt $a$ prevents the blocks from swinging laterally on the bolts $c$.

It will be observed that the blocks have open recesses $x$, in which are the bolts $c$. By this means great advantage is gained in attaching and detaching the holder parts.

By simply loosening the nuts of the bolts $c$ and $a$ the tooth can be removed. Then by moving the holder parts toward each other until the recesses $x$ leave the bolts $c$ the holder is detached from the beam without removing any nuts or bolts. This is of advantage in manufacturing and shipping the knockdowns, because the bolts $c$ can be attached to the beam in their holes, and the bolt $a$, coupling the parts D together, keeps them in pairs, and no parts are lost and they are ready for attachment, and no nuts have to be removed to attach the holder parts to the beam nor to attach the tooth in the holder.

With the opening in the lower wall of the groove $r$, and the open recesses $x$ in lieu of holes, the blocks are more easily cast and dressed, and the holder is light, easily adjusted, and simple. Of course the holder may be employed on any other side of the beam A.

Having thus described my improvements, what I claim, and desire to secure by Letters Patent, is—

1. In combination, the harrow-beam, the blocks, having the grooves cutting through the side of the blocks at the center of their curve, a bolt coupling the blocks together, the bolts attaching the blocks to the beam, and a curved tooth clamped between the upper walls of the grooves and the face of the beam at the opening in the grooves, substantially as set forth.

2. In combination, the beam, a harrow-tooth, the blocks having the open side recesses, their coupling-bolt, and bolts passing through said open recesses and the beam, whereby the holder can be attached, detached, and adjusted without removing any bolts or nuts, substantially as set forth.

In testimony of the foregoing I have hereunto subscribed my name in presence of two witnesses.

PETER H. WILMS.

Witnesses:
H. D. POST,
GEO. H. SAUTER.